United States Patent
Blunt et al.

(10) Patent No.: US 6,940,450 B2
(45) Date of Patent: Sep. 6, 2005

(54) ROBUST PREDICTIVE DECONVOLUTION SYSTEM AND METHOD

(75) Inventors: Shannon D. Blunt, Alexandria, VA (US); Karl R. Gerlach, Chesapeake, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 21 days.

(21) Appl. No.: 10/673,343

(22) Filed: Sep. 30, 2003

(65) Prior Publication Data

US 2005/0046612 A1 Mar. 3, 2005

Related U.S. Application Data

(60) Provisional application No. 60/499,372, filed on Sep. 3, 2003.

(51) Int. Cl.$^7$ ............................. G01S 7/292; G01S 7/32; G01S 13/00

(52) U.S. Cl. ............................ 342/195; 342/89; 342/118; 342/134; 342/175; 342/196; 342/202; 342/204

(58) Field of Search ..................... 342/165–174, 342/25 R–25 F, 82–103, 118, 128–146, 175, 189–197, 202–204

(56) References Cited

U.S. PATENT DOCUMENTS 5,805,107 A   9/1998  Schruth et al.

OTHER PUBLICATIONS

D.L. Kutrubes et al., "Determination of GPR processing capabilities using ProMAX"; Proceedings of the IEEE Dual–Use Technologies & Applications Conference; May 23–26, 1994; vol. 2, pp. 439–446.*

S.D. Blunt et al., "Adaptive Pulse Compression"; Proceedings of the IEEE Radar Conference; Apr. 26–29, 2004, pp. 271–276.*

Ackroyd et al, "Optimum Mismatched Filters For Sidelobe Suppression", IEEE Trans. Aerospace and Electronic Systems, vol. AES–9, No. 2, pp. 214–218, Mar. 1973.

(Continued)

*Primary Examiner*—Bernarr E. Gregory
(74) *Attorney, Agent, or Firm*—John J. Karasek; L. George Legg

(57) ABSTRACT

A method for processing a received, modulated pulse (i.e. waveform) that requires predictive deconvolution to resolve a scatterer from noise and other scatterers includes receiving a return signal; obtaining $L+(2M-1)(N-1)$ samples y of the return signal, where $y(l)=\tilde{x}^T(l)s+v(l)$; applying RMMSE estimation to each successive N samples to obtain initial impulse response estimates $[\hat{x}_1\{-(M-1)(N-1)\}, \ldots, \hat{x}_1\{-1\}, \hat{x}_1\{0\}, \ldots, \hat{x}_1\{L-1\}, \hat{x}_1\{L\}, \ldots, \hat{x}_1\{L-1+(M-1)(N-1)\}]$; computing power estimates $\hat{\rho}_1(l)=|\hat{x}_1(l)|^2$ for $l=-(M-1)(N-1), \ldots, L-1+(M-1)(N-1)$; computing MMSE filters according to $w(l)=\rho(l)(C(l)+R)^{-1}s$, where $\rho(l)=|x(l)|^2$ is the power of $x(l)$, and $R=E[v(l)v^H(l)]$ is the noise covariance matrix; applying the MMSE filters to y to obtain $[\hat{x}_2\{-(M-2)(N-1)\}, \ldots, \hat{x}_2\{-1\}, \hat{x}_2\{0\}, \ldots, \hat{x}_2\{L-1\}, \hat{x}_2\{L\}, \ldots, \hat{x}_2\{L-1+(M-2)(N-1)\}]$; and repeating (d)–(f) for subsequent reiterative stages until a desired length-L range window is reached, thereby resolving the scatterer from noise and other scatterers. The RMMSE predictive deconvolution approach provides high-fidelity impulse response estimation. The RMMSE estimator can reiteratively estimate the MMSE filter for each specific impulse response coefficient by mitigating the interference from neighboring coefficients that is a result of the temporal (i.e. spatial) extent of the transmitted waveform. The result is a robust estimator that adaptively eliminates the spatial ambiguities that occur when a fixed receiver filter is used.

29 Claims, 7 Drawing Sheets

OTHER PUBLICATIONS

O'Brien et al, "High Resolution Deconvolution Using Least– Absolute–Values Minimization", IEEE Ultrasonics Symposium. pp. 1151–1156, 1990.

Felhauer et al, "Digital Signal Processing For Optimum Wideband Channel Estimation In The Presence of Noise" IEE Proceedings–F, vol. 140, No. 3, pp. 179–186, Jun. 1993.

Misaridis et al, "Potential of Coded Excitation in Medical Ultrasound Imaging", Elsevier Science, vol. 38, pp. 183–189 2000.

McGill et al, "A Micromachined Proconcentrator For Enhanced Trace Detection Of Illicit Materials", NRL Washington, DC, pp. 494.

Yarlagadda et al, "Fast Algorithms For Ip Deconvolution", IEEE Trans. on Acoustics, Speech and Signal Processing, vol. ASSP–33, No. 1, Feb. 1985.

Sarkar et al, "An Ultra–Low Sidelope pulse Compression Technique For High Performance Radar System" IEEE National Radar Conference, pp. 111–114, 1997.

Song et al, "Estimation Theoretic Approach For Radar Pulse Compression Processing and Its Optimal Codes", Electronics Letters, vol. 36, No. 3, pp. 250–252, Feb. 3, 2000.

Suh et al, "Ultrasonic Inspection of Studs (Bolts) Using Dynamic Predictive Deconvolution and Wave Shaping", IEEE Trans. on Ultrasonics, Ferroelectronics and Frequency Control, vol. 46, No. 2, pp. 457–463, Mar. 1999.

Zrnic et al, "Range Sidelobe Suppression For Pulse Compression Radars Utilizing Modified RLs Algorithm", IEEE, pp. 1008–1011, 1998.

* cited by examiner

ROBUST PREDICTIVE DECONVOLUTION SYSTEM AND METHOD

The present application claims the benefit of the priority filing date of provisional patent application No. 60/499,372, filed Sep. 3, 2003, incorporated herein by reference.

TECHNICAL FIELD

This invention relates to a method and system for predictive deconvolution, which is otherwise known as pulse compression in radar applications. More particularly, the invention relates to robust predictive deconvolution using minimum mean-square error reiteration.

BACKGROUND ART

In many sensing applications, such as radar pulse compression, sonar, ultrasonic non-destructive evaluation for structural integrity, biomedical imaging, and seismic estimation, it is desirable to estimate the impulse response of an unknown system by driving the system with a known signal having a finite temporal extent. The process of separating the known signal from the received output of the system in order to estimate the unknown impulse response is known as predictive deconvolution.

Predictive deconvolution provides a means to obtain the high spatial resolution of a short, high bandwidth pulse without the need for very high peak transmit power, which may not be feasible. This is accomplished by transmitting a longer pulse that is phase or frequency modulated to generate a wideband waveform. The transmission of the wideband waveform into the unknown system results in a received return signal at the sensor that is the convolution of the waveform and the system impulse response, which possesses large coefficient values at sample delays corresponding to the round-trip travel time of the transmitted waveform from the sensor to a significant reflecting object (also called a scatterer) and back to the sensor. The purpose of predictive deconvolution is to accurately estimate the unknown system impulse response from the received return signal based upon the known transmitted waveform.

A well-known approach to predictive deconvolution, used extensively in radar and biomedical imaging applications, is known as matched filtering, e.g. as described in M. I. Skolnik, *Introduction to Radar Systems*, McGraw-Hill, New York, 1980, pp. 420–434; T. X. Misaridis, K. Gammelmark, C. H. Jorgensen, N. Lindberg, A. H. Thomsen, M. H. Pedersen, and J. A. Jensen, "Potential of coded excitation in medical ultrasound imaging," Ultrasonics, Vol. 38, pp. 183–189, 2000. Matched filtering has been shown to maximize the received signal-to-noise ratio (SNR) in the presence of white Gaussian noise by convolving the transmitted signal with the received radar return signal. One can represent matched filtering in the digital domain as the filtering operation $$\hat{x}_{MF}(l)=s^H\tilde{y}(l), \qquad (1)$$

where $\hat{x}_{MF}(l)$, for $l=0, \ldots, L-1$, is the estimate of the $l^{th}$ delayed sample of the system impulse response, $s=[s_1 \; s_2 \ldots s_N]^T$ is the length-N sampled version of the transmitted waveform, $\tilde{y}(l)=[y(l) \; y(l+1) \ldots y(l+N-1)]^T$ is a vector of N contiguous samples of the received return signal, and $(\bullet)^H$ and $(\bullet)^T$ are the conjugate transpose (or Hermitian) and transpose operations, respectively. Each individual sample of the return signal can be expressed as $$y(l)=\tilde{x}^T(l)s+v(l), \qquad (2)$$

where $\tilde{x}(l)=[x(l) \; x(l-1) \ldots x(l-N+1)]^T$ consists of samples of the true system impulse response and $v(l)$ is additive noise. The matched filter output can therefore be written as $$\hat{x}_{MF}(l)=s^H A^T(l)s+s^H v(l), \qquad (3)$$

where $v(l)=[v(l) \; v(l+1) \ldots v(l+N-1)]^T$ and $$A(l) = \begin{bmatrix} x(l) & x(l+1) & \ldots & x(l+N-1) \\ x(l-1) & x(l) & \ddots & \vdots \\ \vdots & \ddots & \ddots & x(l+1) \\ x(l-N+1) & \ldots & x(l-1) & x(l) \end{bmatrix} \qquad (4)$$

is a collection of sample-shifted snapshots (in the columns) of the impulse response.

From (4), it is obvious that estimation via matched filtering will suffer from spatial ambiguities (also known as range sidelobes in the radar vernacular) due to the influence from neighboring impulse response coefficients (i.e. the off-diagonal elements of A(l)). To alleviate this effect, Least-Squares (LS) solutions have been proposed, e.g. in M. H. Ackroyd and F. Ghani, "Optimum mismatched filters for sidelobe suppression," IEEE Trans. Aerospace and Electronic Systems, Vol. AES-9, pp. 214–218, March 1973; T. Felhauer, "Digital Signal Processing for Optimum Wideband Channel Estimation in the Presence of Noise," IEE Proceedings-F, Vol. 140, No. 3, pp. 179–186, June 1993; S. M. Song, W. M. Kim, D. Park, and Y. Kim, "Estimation theoretic approach for radar pulse compression processing and its optimal codes," Electronic Letters, Vol. 36, No. 3, pp. 250–252, February 2000; B. Zrnic, A. Zejak, A. Petrovic, and I. Simic, "Range sidelobe suppression for pulse compression radars utilizing modified RLS algorithm," Proc. IEEE Int. Symp. Spread Spectrum Techniques and Applications, Vol. 3, pp. 1008–1011, September 1998; and T. K. Sarkar and R. D. Brown, "An ultra-low sidelobe pulse compression technique for high performance radar systems," in Proc. IEEE National Radar Conf., pp. 111–114, May 1997. LS solutions decouple neighboring impulse response coefficients which have been smeared together due to the temporal (and hence spatial) extent of the transmitted waveform. The LS solution models the length-(L+N−1) received return signal as $$y=Sx+v, \qquad (5)$$

where $x=[x(0) \; x(1) \ldots x(L-1)]^T$ are the L true impulse response coefficients that fall within the data window, $v=[v(0) \; v(1) \ldots v(L+N-2)]^T$ are additive noise samples, and the convolution of the transmitted waveform with the system impulse response is approximated as the matrix multiplication $$Sx = \begin{bmatrix} s_1 & 0 & \ldots & 0 \\ \vdots & s_1 & & \vdots \\ s_N & \vdots & \ddots & 0 \\ 0 & s_N & & s_1 \\ \vdots & & \ddots & \vdots \\ 0 & \ldots & 0 & s_N \end{bmatrix} x. \qquad (6)$$

The LS model of (6) is employed extensively in radar pulse compression, seismic estimation, e.g. as described in R. Yarlaggadda, J. B. Bednar, and T. L. Watt, "Fast algorithm for $l_p$ deconvolution," IEEE Trans. Acoustics, Speech, and Signal Processing, Vol. ASSP-33, No. 1, pp. 174–182, February 1985; and ultrasonic non-destructive evaluation, e.g. as in M. S. O'Brien, A. N. Sinclair, and S. M. Kramer, "High resolution deconvolution using least-absolute-values minimization," Proc. Ultrasonics Symposium, pp. 1151–1156, December 1990; and D.-M. Suh, W.-W. Kim, and J.-G. Chung, "Ultrasonic inspection of studs (bolts) using dynamic predictive deconvolution and wave shaping," IEEE Trans. Ultrasonics, Ferroelectrics, and Frequency Control, Vol. 46, No. 2, pp. 457–463, March 1999. The general form of the LS solution is $$\hat{x}_{LS}=(S^H S)^{-1}S^H y. \tag{7}$$

For the received signal model of (5), it can be shown that the LS solution of (7) is optimal in the mean-square error (MSE) sense when the additive noise is white. However, upon further inspection one finds that the LS received signal model does not completely characterize the received return signal because it does not account for the convolution of the transmitted waveform with impulse response coefficients x(l) prior to l=0. The result is that the presence of a significant impulse response coefficient within N−1 samples prior to x(0) can cause severe mis-estimation of the desired coefficients within the data window.

There is, therefore, a need for a predictive deconvolution system with improved robustness, accuracy, and resolution.

DISCLOSURE OF THE INVENTION

According to the invention, a method for processing a received, modulated pulse that requires predictive deconvolution to resolve a scatterer from noise and other scatterers includes (a) receiving a return signal; (b) obtaining L+(2M−1)(N−1) samples y of the return signal, where y(l)=$\tilde{x}^T(l)s+v(l)$; (c) applying RMMSE estimation to each set of N contiguous samples to obtain initial impulse response estimates [$\hat{x}_1\{-(M-1)(N-1)\}$, ..., $\hat{x}_1\{-1\}$, $\hat{x}_1\{0\}$, ..., $\hat{x}_1\{L-1\}$, $\hat{x}_1\{L\}$, ..., $\hat{x}_1\{L-1+(M-1)(N-1)\}$]; (d) computing power estimates $\rho_1(l)=|\hat{x}_1(l)|^2$ for l=−(M−1)(N−1), ..., L−1+(M−1)(N−1); (e) computing MMSE filters according to w(l)=ρ(l)(C(l)+R)$^{-1}$s, where $\rho(l)=|x(l)|^2$ is the power of x(l), and R=E[v(l) v$^H$(l)] is the noise covariance matrix; (f) applying the MMSE filters to y to obtain [$\hat{x}_2\{-(M-2)(N-1)\}$, ..., $\hat{x}_2\{-1\}$, $\hat{x}_2\{0\}$, ..., $\hat{x}_2\{L-1\}$, $\hat{x}_2\{L\}$, ..., $\hat{x}_2\{L-1+(M-2)(N-1)\}$]; and repeating (d)–(f) for subsequent reiterative stages until a desired length-L range window is reached, thereby resolving the scatterer from noise and other scatterers.

Also according to the invention, a radar receiver system includes a receiver, a processor including a RMMSE radar pulse compression algorithm, and a target detector.

Also according to the invention, a method for processing a received, modulated radar pulse to resolve a radar target from noise or other targets includes (a) receiving a radar return signal; (b) obtaining L+(2M−1)(N−1) samples y of the radar return signal, where y(l)=$\tilde{x}^T(l)s+v(l)$; (c) applying RMMSE pulse compression to each set of N contiguous samples to obtain initial radar impulse response estimates [$\hat{x}_1\{-(M-1)(N-1)\}$, ..., $\hat{x}_1\{-1\}$, $\hat{x}_1\{0\}$, ..., $\hat{x}_1\{L-1\}$, $\hat{x}_1\{L\}$, ..., $\hat{x}_1\{L-1+(M-1)(N-1)\}$]; (d) computing power estimates $\rho_1(l)=|\hat{x}_1(l)|^2$ for l=−(M−1)(N−1), ..., L−1+(M−1)(N−1); (e) computing range-dependent filters according to w(l)=ρ(l)(C(l)+R)$^{-1}$s, where $\rho(l)=|x(l)|^2$ is the power of x(l), and R=E[v(l) v$^H$(l)] is the noise covariance matrix; (f) applying the range-dependent filters to y to obtain [$\hat{x}_2\{-(M-2)(N-1)\}$, ..., $\hat{x}_2\{-1\}$, $\hat{x}_2\{0\}$, ..., $\hat{x}_2\{L-1\}$, $\hat{x}_2\{L\}$, ..., $\hat{x}_2\{L-1+(M-2)(N-1)\}$]; and repeating (d)–(f) for subsequent reiterative stages until a desired length-L range window is reached, thereby resolving the radar target from noise or other targets.

The Reiterative Minimum Mean-Square Error (RMMSE) predictive deconvolution system and method of the invention provide high-fidelity impulse response estimation compared to other systems such as matched filtering and LS. In one embodiment, the RMMSE estimator reiteratively estimates the MMSE filter for each specific impulse response coefficient by mitigating the interference from neighboring coefficients that is a result of the temporal (i.e. spatial) extent of the transmitted waveform. The result is a robust estimator that adaptively eliminates the spatial ambiguities that occur when a fixed receiver filter is used.

The invention has obvious applications in military radar and sonar, and it is also useful for civilian radar, e.g. in airport radar systems and in weather radar systems, e.g. Doppler radar, and other environmental radar applications. It may also find use in range profiling, image recognition for Synthetic Aperture Radar (SAR) and Inverse SAR (ISAR), remote sensing, ultrasonic non-destructive evaluation for structural integrity, seismic estimation, biomedical imaging, inverse filtering of optical images, or any other application requiring robust deconvolution of a known waveform (or filter) from a desired unknown impulse response.

Additional features and advantages of the present invention will be set forth in, or be apparent from, the detailed description of preferred embodiments which follows.

BEST MODE FOR CARRYING OUT THE INVENTION

Definitions: The term "convolution" means the process that yields the output response of an input to a linear time-invariant system, and in the general discrete sense, an input x(n) is convolved with a Linear Time Invariant (LTI) system h(n) to yield an output y(n) as $$y(n) = \sum_{k=-\infty}^{k=\infty} x(k)h(n-k)$$

such as is described and defined in J. G. Proakis and D. G. Manolakis, *Digital Signal Processing: Principles,*

*Algorithms, and Applications,* 3rd Ed., pp. 75–82, Prentice Hall: Upper Saddle River, N.J. (1996). The term "deconvolution" as used herein means the process that given the output of a system determines an unknown input signal to the system. Given an output y(n) that is the convolution of some input x(n) to some LTI system h(n), deconvolution is the inverse operation that takes y(n) and produces x(n). Deconvolution is a general term meaning that x(n) is to be estimated from the observed y(n). See Id. at p. 355. The term "scatterer" means something in the path of a transmitted waveform that causes a significant reflection (relative to the noise) back to the receiver of the sensor.

Figure 1:
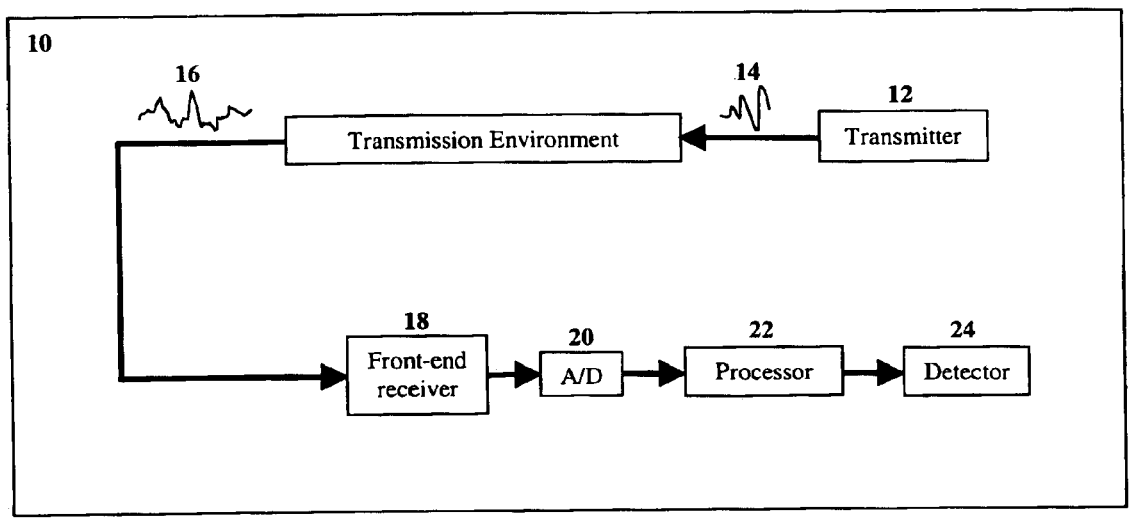
FIG. 1 is a schematic diagram of a predictive deconvolution system according to the invention.

Referring now to FIG. 1, a predictive deconvolution system 10 includes a transmitter 12 for transmitting a phase or frequency modulated pulse (or waveform) 14 that, upon interacting with its transmission environment's unknown impulse response 16 (to be estimated, as is described further below) and forms a signal 18 that is a convolution of waveform 14 and impulse response 16, an analog front-end receiver 18 for receiving signal 16, an optional analog-to-digital (A/D) converter 20, a processor 22 for processing analog or digital signal 16, and a detector 24 The processor 22 includes a Reiterative Minimum Mean-Square Error (RMMSE) estimation algorithm, as is described below.

Minimum Mean-Square Error (MMSE) estimation is a Bayesian estimation approach that employs prior information in order to improve estimation accuracy. The exact form that the prior information will take will be addressed shortly. First, however, the signal model must be constructed. From (3), we see that the collection of N samples of the received return signal can be expressed as $$\tilde{y}(l) = A^T(l)s + v(l). \quad (8)$$

This is the received signal model used by the matched filter formulation and takes into account all the necessary impulse response coefficients for a given received return sample. To develop the MMSE filter, the matched filter $s^H$ in (3) is replaced with the MMSE filter, denoted $w^H(l)$, in which the form of the MMSE filter is dependent upon the length-N sample swath of the impulse response under consideration. Thereafter, the MMSE cost function $$J(l) = E[|x(l) - w^H(l)\tilde{y}(l)|^2] \quad (9)$$

is solved for each impulse response coefficient l=0, ..., L−1, where E[•] denotes expectation. This is done by differentiating with respect to $w^H(l)$ and then setting the result to zero. The MMSE filter is found to take the form $$w(l) = (E[\tilde{y}(l)\tilde{y}^H(l)])^{-1} E[\tilde{y}(l)x^*(l)], \quad (10)$$

where (•)* is the complex conjugate operation. After substituting for $\tilde{y}(l)$ from (8) and assuming that the impulse response coefficients are, in general, uncorrelated with one another and are also uncorrelated with the noise, one obtains $$w(l) = \rho(l)(C(l)+R)^{-1}s, \quad (11)$$

where $\rho(l) = E[|x(l)|^2]$ is the expected power of x(l), and $R = E[v(l) v^H(l)]$ is the noise covariance matrix. On assuming neighboring coefficients are uncorrelated, the $(i,j)^{th}$ element of the matrix C(l) is $$C(l)_{i,j} = E\left[\sum_{n=\kappa_L}^{\kappa_U} \rho(l-n+i-1)s(n)s^*(n-i+j)\right] \quad (12)$$

in which $\kappa_L = \max\{0, i-j\}$ is the summation lower bound and $\kappa_U = \min\{N-1, N-1+i-j\}$ is the upper bound. Also, any prior information regarding the noise can be employed via the noise covariance matrix R. For instance, for a white noise assumption R is diagonal.

In its current state the MMSE filter is a function of the powers of the surrounding impulse response coefficients, which in practice are unavailable. This lack of prior knowledge can be taken into account by setting all the initial coefficient estimates equal. Therefore, the initial MMSE filter reduces to the form $$\tilde{w} = \tilde{C}^{-1}s \quad (13)$$

where the noise term is assumed negligible and $$\tilde{C}_{i,j} = \left[\sum_{n=\kappa_L}^{\kappa_U} s(n)s^*(n-i+j)\right] \quad (14)$$

is invariant to the sample delay l. The initial MMSE filter can therefore be pre-computed and then implemented in the same way as the traditional matched filter. The inclusion of the matrix $\tilde{C}$ serves to provide a "local" LS initial estimate.

Figure 2:
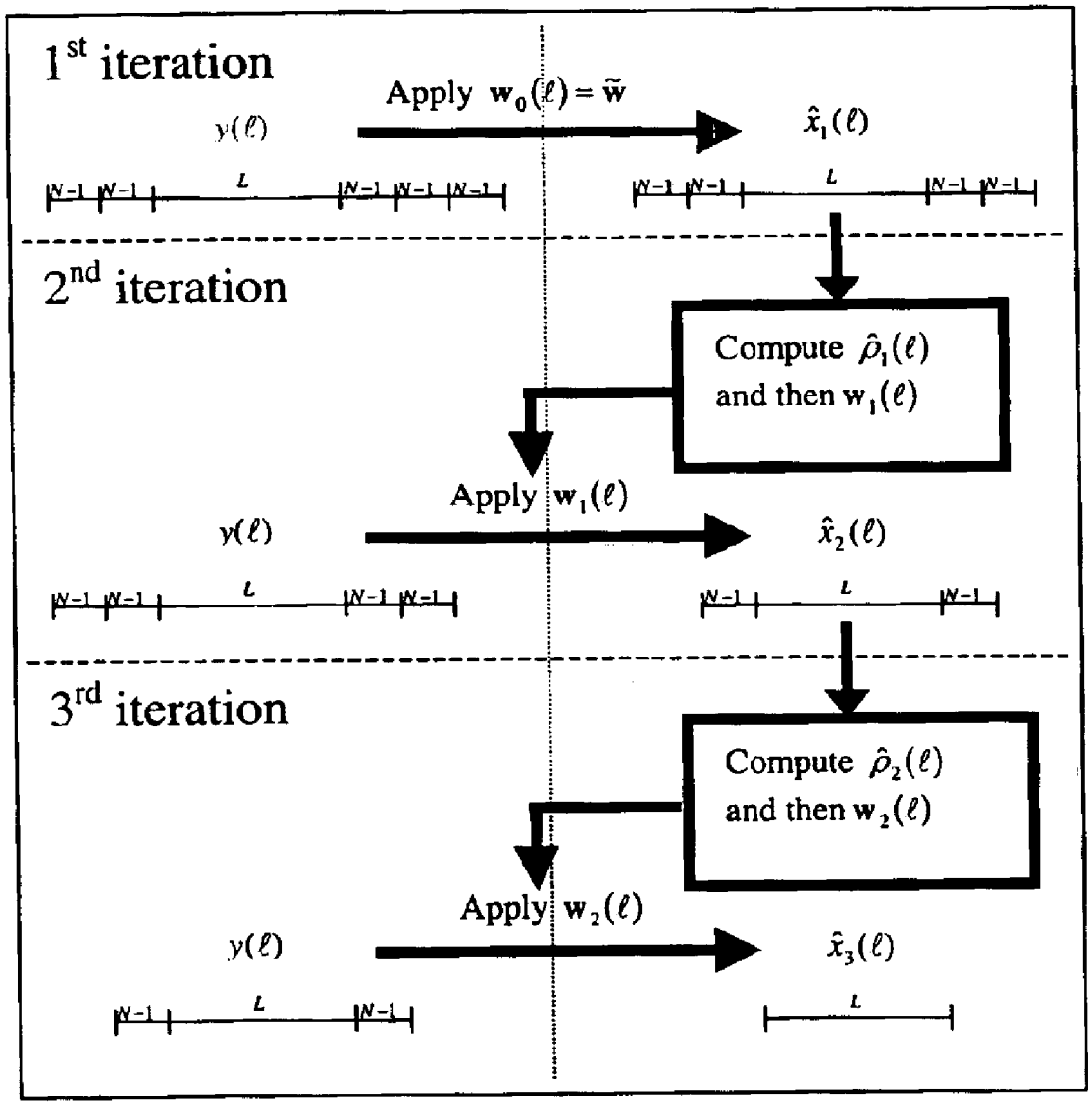
FIG. 2 is a block diagram of a 3-stage RMMSE predictive deconvolution algorithm according to the invention.

FIG. 2 illustrates the Reiterative MMSE (RMMSE) predictive deconvolution algorithm for three iterations. In general, the RMMSE algorithm operates as follows:

1) Collect the L+(2M−1)(N−1) samples of the received return signal [y{−(M−1)(N−1)}, ..., y{−1}, y{0}, ..., y{L−1}, y{L}, ..., y{L−1+M(N−1)}], which comprise the length-L data window along with the (M−1)(N−1) samples prior to the data window and the M(N−1) samples after the data window.

2) Apply the initial MMSE filter from (13) to obtain the initial impulse response estimates [$\hat{x}_1\{-(M-1)(N-1)\}$, ..., $\hat{x}_1\{-1\}$, $\hat{x}_1\{0\}$, ..., $\hat{x}_1\{L-1\}$, $\hat{x}_1\{L\}$, ..., $\hat{x}_1\{L-1+(M-1)(N-1)\}$].

3) Compute the initial power estimates $\hat{\rho}_1(l) = |\hat{x}_1(l)|^2$ for l=−(M−1)(N−1), ..., L−1+(M−1)(N−1) which are used to compute the filters $w_1(l)$ as in (11), and then apply to $\tilde{y}(l)$ to obtain [$\hat{x}_2\{-(M-2)(N-1)\}$, ..., $\hat{x}_2\{-1\}$, $\hat{x}_2\{0\}$, ..., $\hat{x}_2\{L-1\}$, $\hat{x}_2\{L\}$, ..., $\hat{x}_2\{L-1+(M-2)(N-1)\}$].

4) Repeat 2) and 3), changing the indices where appropriate, until the desired length-L data window is reached.

The initial estimate of the impulse response found by applying the MMSE filter is used as a priori information to reiterate the MMSE filter and improve performance. This is done by employing the MMSE filter formulation from (11) in which the respective powers of the impulse response coefficients are taken from the current estimate. It has been found that two or three reiteration steps allow the RMMSE filter to exclude the effects of scatterers prior to the data window, as well as to suppress the spatial ambiguities very close to the level of the noise floor. The RMMSE filter does especially well when the impulse response is somewhat sparsely parameterized (i.e. highly spiky), as is the case for system designed to have high resolution. Note that each reiteration step will reduce the number of coefficient estimates by 2(N−1). To counteract this, it is necessary to increase the size of the data window by 2M (N−1) samples, where M is the number of reiteration steps. Typically, however, L>>N so that this reduction in data window size is negligible.

An important factor regarding practical implementation is the non-singularity of the N×N matrix ([C(l)]+[R]). This can be addressed by instituting a nominal level for which the estimated coefficients are not allowed to go below. An alternative to this would be to re-estimate only those coefficients that are above some threshold since the small-valued coefficients do not contain a detectable scatterer.

To demonstrate the performance of the RMMSE algorithm we examine three cases. The first case is typical of the scenario often addressed for LS estimation techniques and consists of an impulse response with a single large scatterer in noise and low-level clutter. The second case we address is when there is a second large scatterer that resides just prior to the data window. In this case it is expected that the LS estimator will substantially degrade since this important region is not accounted for in the received signal model. The final case is a more realistic scenario in which there are several spatially dispersed scatterers of varying magnitude.

For the first two cases, the waveform selected is the length N=30 polyphase modulated Lewis-Kretschmer P3 code, which on receive (after down-conversion to baseband in the receiver front-end) is defined as $$s(n) = \exp\left(\frac{j\pi n^2}{N}\right), \quad n = 0, 1, \ldots, N-1. \tag{15}$$

Figure 3:
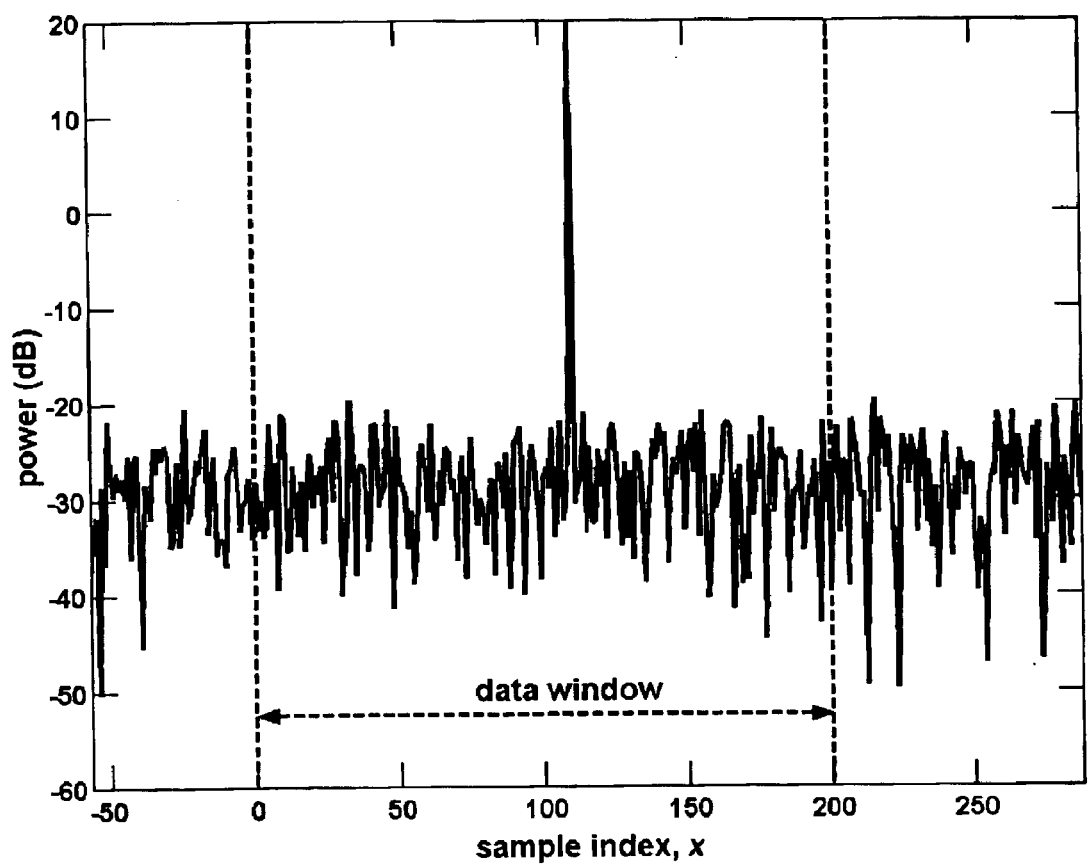
FIG. 3 is a graph showing an impulse response with a single large coefficient (scatterer) in the data window according to the invention.
Figure 4:
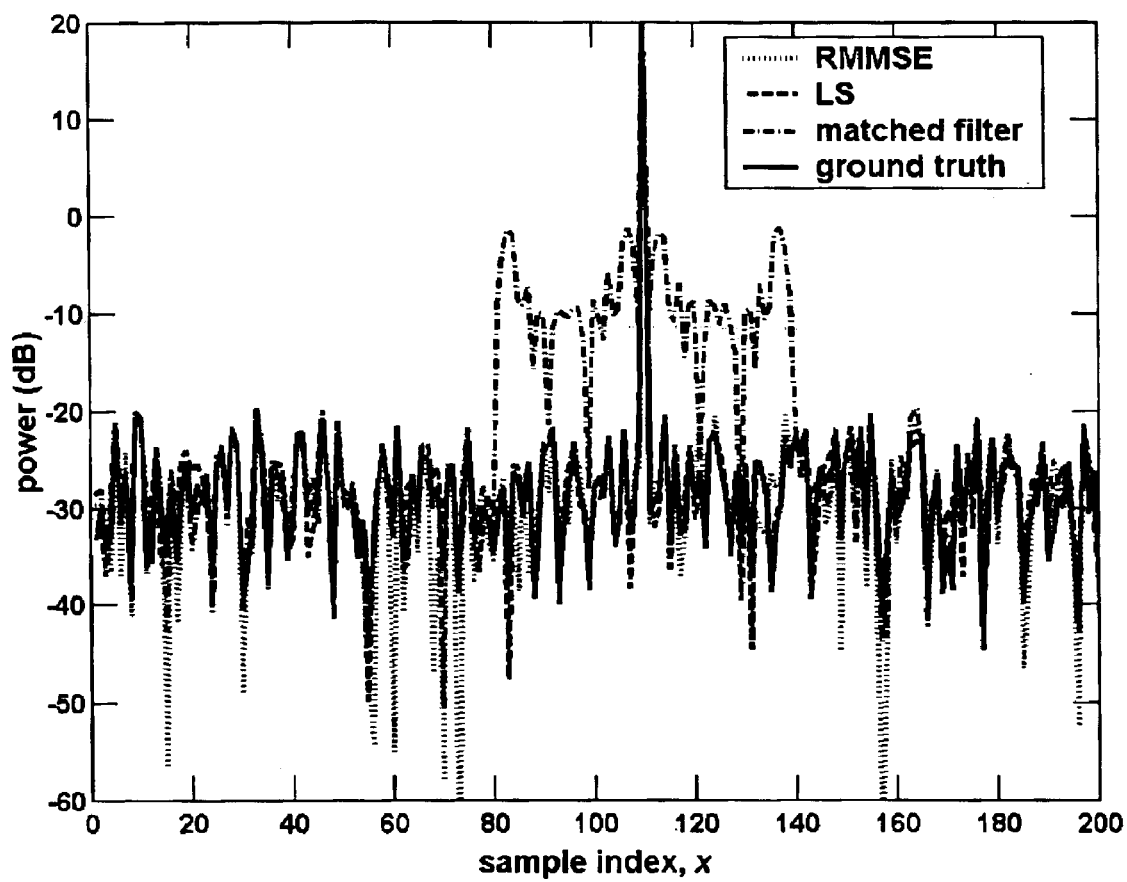
FIG. 4 is a graph comparing the performance of the RMMSE algorithm according to the invention with LS and matched filter systems for a single-scatterer impulse response.

The noise and clutter are modeled as zero-mean Gaussian with powers set to 70 dB and 50 dB below the signal power, respectively. For both cases we perform two iterations of the RMMSE algorithm and then compare the RMMSE-estimated impulse response with the true impulse response, as well as with the results obtained from using LS and the matched filter. The impulse response for the first case is depicted in FIG. 3 for a single scatterer present in the data window which consists of 200 range gates. FIG. 4 illustrates the results from the different estimation techniques in which the matched filter experiences significant spatial ambiguities while both LS and RMMSE have suppressed the spatial ambiguities so that the true scatterer location is evident and smaller nearby scatterers could be detectable.

Figure 5:
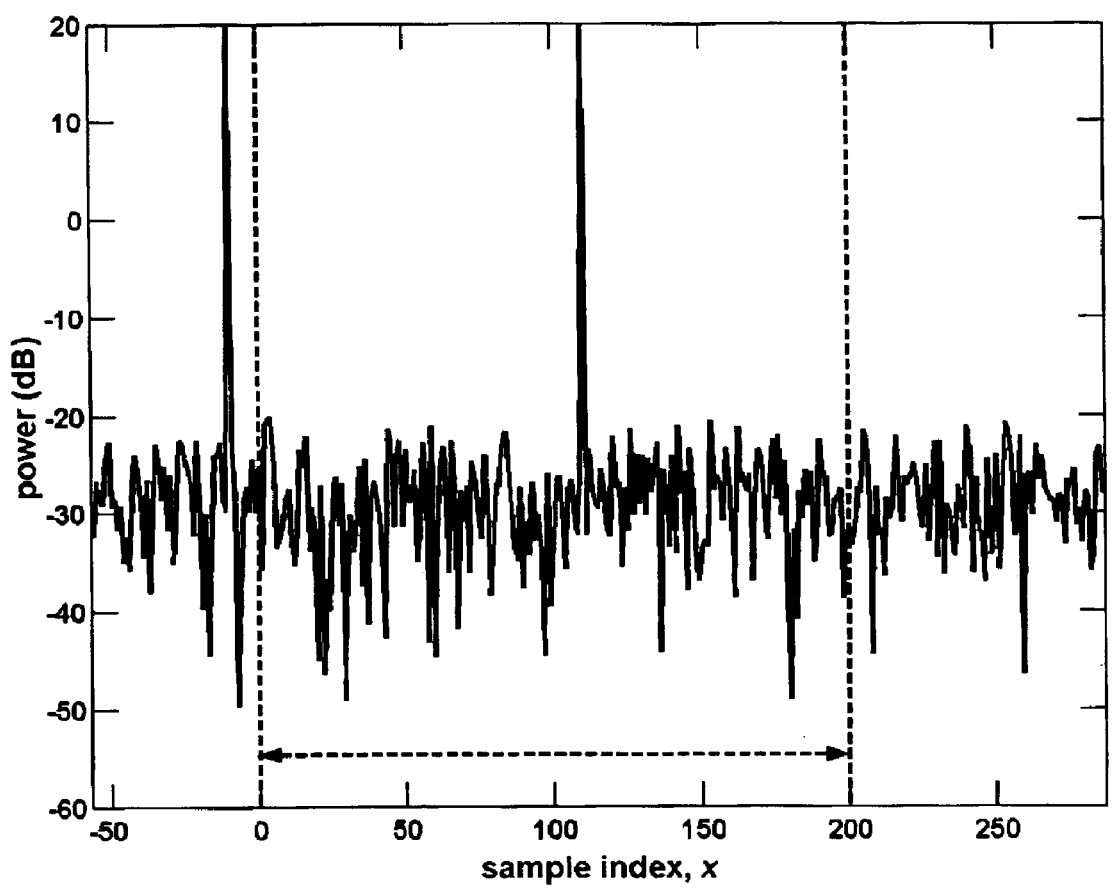
FIG. 5 is a graph as in FIG. 3 but showing an impulse response with a second large coefficient just prior to the data window according to the invention.
Figure 6:
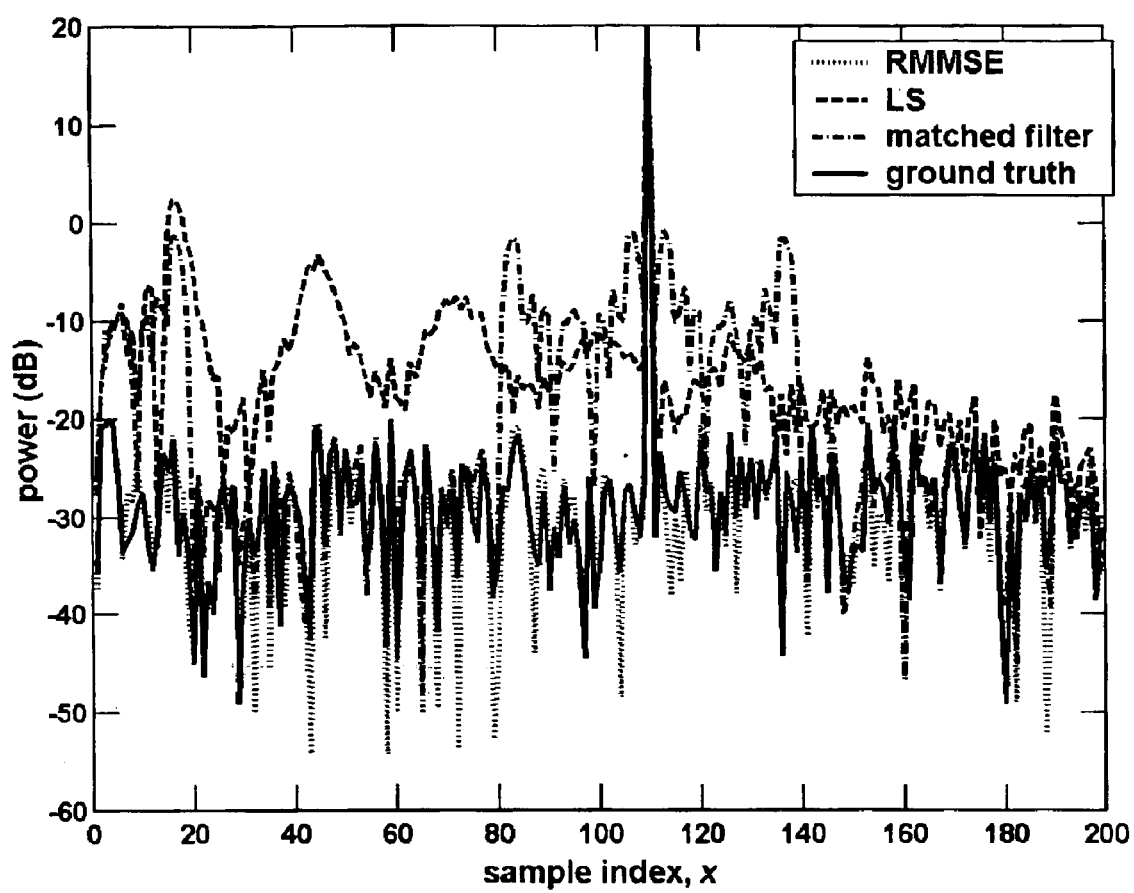
FIG. 6 is a graph comparing the RMMSE, LS, and matched filter systems for a scatterer just prior to the data window.

For the scenario just described, the LS and RMMSE estimators perform almost identically. However, when there is a significant scatterer present just prior to the range window, as depicted in FIG. 5, the LS estimator is expected to degrade substantially. From FIG. 6, the LS estimator truly does suffer from severe mis-estimation when a significant scatterer cannot be expressed in the model. However, the performance of the RMMSE estimator is indistinguishable from the previous case where only a single scatterer was present. This is obviously due to the fact that the RMMSE estimator takes the previous estimates of the surrounding impulse response coefficients into account when estimating the impulse response.

Table 1 presents the Mean Squared-Error (MSE) for both cases discussed using LS, RMMSE, and normalized matched filtering. The MSE is averaged for all 200 coefficients in the data window and over 100 runs using the same scatterer(s), with the clutter and noise distributed according to a zero-mean Gaussian distribution for each run independently.

TABLE 1

MSE performance comparison

|  | Norm. MF | LS | RMMSE |
| --- | --- | --- | --- |
| Case 1 | −12.3 dB | −40.9 dB | −35.8 dB |
| Case 2 | −11.2 dB | −11.3 dB | −34.7 dB |

For case 1 (single scatterer), the normalized matched filter has a large MSE due to spatial ambiguities, while LS and RMMSE perform nearly the same with LS just marginally better. However, for case 2 (scatterer just prior to the data window), the MSE attained by LS degrades to nearly that of the normalized matched filter, while the RMMSE maintains roughly the same MSE as in the previous case.

Figure 7:
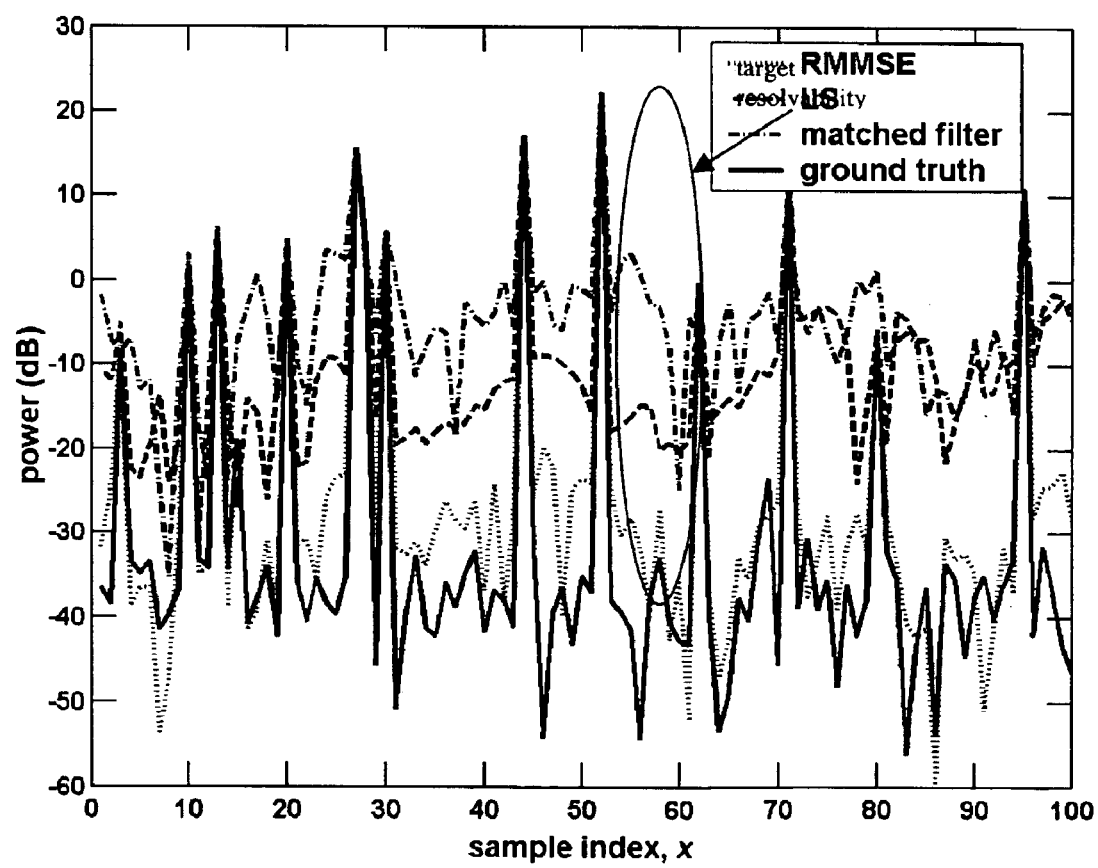
FIG. 7 is a graph comparing the RMMSE, LS, and the matched filter systems for a realistic scenario in which there are several scatterers with substantially varying magnitudes.

For the third case, we examine the performance for the three estimation techniques when the impulse response contains several dispersed scatterers of varying magnitude (both within and outside of the data window). FIG. 7 illustrates the significant improvement in estimation performance of the RMMSE estimator as compared to matched filtering and LS estimation. Most notable is the resolvability of two very closely spaced scatterers. RMMSE completely resolves the two scatterers whereas for LS and matched filtering it is not completely clear whether it is one or two scatterers.

Obviously many modifications and variations of the present invention are possible in the light of the above teachings. It is therefore to be understood that the scope of the invention should be determined by referring to the following appended claims.

We claim:

1. A method for processing a received, modulated pulse that requires predictive deconvolution to resolve a scatterer from noise and other scatterers, comprising:
   a) receiving a return signal;
   b) obtaining L+(2M−1)(N−1) samples y of the return signal, where y(l)=$\tilde{x}^T$(l)s+v(l);
   c) applying RMMSE estimation to each successive N samples to obtain initial impulse response estimates [$\hat{x}_1$\{−(M−1)(N−1)\}, . . . , $\hat{x}_1$\{−1\}, $\hat{x}_1$\{0\}, . . . , $\hat{x}_1$\{L−1\}, $\hat{x}_1$\{L\}, . . . , $\hat{x}_1$\{L−1+(M−1)(N−1)\}];
   d) computing power estimates $\hat{\rho}_1$(l)=|$\hat{x}_1$(l)|$^2$ for l=−(M−1)(N−1), . . . , L−1+(M−1)(N−1);
   e) computing MMSE filters according to w(l)=σ(l)(C(l)+R)$^{-1}$s, where ρ(l)=|x(l)|$^2$ is the power of x(l), and R=E[v(l)v$^H$(l)] is the noise covariance matrix;
   f) applying the MMSE filters to y to obtain [$\hat{x}_2$\{−(M−2)(N−1)\}, . . . , $\hat{x}_2$\{−1\}, $\hat{x}_2$\{0\}, . . . , $\hat{x}_2$\{L−1\}, $\hat{x}_2$\{L\}, . . . , $\hat{x}_2$\{L−1+(M−2)(N−1)\}]; and
   g) repeating (d)–(f) for subsequent reiterative stages until a desired length-L range window is reached, thereby resolving the scatterer from noise and other scatterers.

2. A method as in claim 1, wherein the RMMSE estimation is performed with a plurality of parallel processors.

3. A method as in claim 1, further comprising setting a nominal level for which the power estimates are not allowed to fall below.

4. A method as in claim 1, wherein the y samples are obtained via A/D conversion.

5. A method as in claim 1, wherein the method is applied in range profiling.

6. A method as in claim 1, wherein the method is applied in a weather radar system.

7. A method as in claim 1, wherein the method is applied in image recognition for Synthetic Aperture Radar (SAR).

8. A method as in claim 1, wherein the method is applied in image recognition for Inverse SAR (ISAR).

9. A method as in claim 1, wherein the method is applied in remote sensing.

10. A method as in claim 1, wherein the method is applied in ultrasonic non-destructive evaluation for structural integrity.

11. A method as in claim 1, wherein the method is applied in seismic estimation.

12. A method as in claim 1, wherein the method is applied in biomedical imaging.

13. A method as in claim 1, wherein the method is applied in inverse filtering of optical images.

14. A radar receiver system, comprising:
   a receiver;
   a processor including a Reiterative Minimum Mean-Square Error estimation (RMMSE) radar pulse compression algorithm; and
   a target detector.

15. A radar receiver system as in claim 14, wherein the RMSSE radar pulse compression algorithm comprises:
   (a) obtaining $L+(2M-1)(N-1)$ samples y of a radar return signal, where $y(l)=\tilde{x}^T(l)s+v(l)$;
   (b) applying RMMSE pulse compression to each set of N contiguous samples to obtain initial radar impulse response estimates $[\hat{x}_1\{-(M-1)(N-1)\}, \ldots, \hat{x}_1\{-1\}, \hat{x}_1\{0\}, \ldots, \hat{x}_1\{L-1\}, \hat{x}_1\{L\}, \ldots, \hat{x}_1\{L-1+(M-1)(N-1)\}]$;
   (c) computing power estimates $\hat{\rho}_1(l)=|\hat{x}_1(l)|^2$ for $l=-(M-1)(N-1), \ldots, L-1+(M-1)(N-1)$;
   (d) computing range-dependent filters according to $w(l)=\rho(l)(C(l)+R)^{-1}s$, where $\rho(l)=|x(l)|^2$ is the power of $x(l)$, and $R=E[v(l)v^H(l)]$ is the noise covariance matrix;
   (e) applying the range-dependent filters to y to obtain $[\hat{x}_2\{-(M-2)(N-1)\}, \ldots, \hat{x}_2\{-1\}, \hat{x}_2\{0\}, \ldots, \hat{x}_2\{L-1\}, \hat{x}_2\{L\}, \ldots, \hat{x}_2\{L-1+(M-2)(N-1)\}]$; and
   (f) repeating (c)–(e) for subsequent reiterative stages until a desired length-L range window is reached.

16. A radar receiver system as in claim 14, further comprising a plurality of parallel processors for performing the RMMSE pulse compression.

17. A radar receiver system as in claim 14, wherein a nominal level is set for which the power estimates are not allowed to fall below.

18. A radar receiver system as in claim 14, further comprising an analog-to-digital (A/D) converter.

19. A radar receiver system as in claim 15, further comprising an analog-to-digital (A/D) converter for obtaining the y samples.

20. A radar receiver system as in claim 14, wherein the system is an airport radar system.

21. A radar receiver system as in claim 14, wherein the system is a weather radar system.

22. A method for processing a received, modulated radar pulse to resolve a radar target from noise or other targets, comprising:
   a) receiving a radar return signal;
   b) obtaining $L+(2M-1)(N-1)$ samples y of the radar return signal, where $y(l)=\tilde{x}^T(l)s+v(l)$;
   c) applying RMMSE pulse compression to each successive N samples to obtain initial radar impulse response estimates $[\hat{x}_1\{-(M-1)(N-1)\}, \ldots, \hat{x}_1\{-1\}, \hat{x}_1\{0\}, \ldots, \hat{x}_1\{L-1\}, \hat{x}_1\{L\}, \ldots, \hat{x}_1\{L-1+(M-1)(N-1)\}]$;
   d) computing power estimates $\hat{\rho}_1(l)=|\hat{x}_1(l)|^2$ for $l=-(M-1)(N-1), \ldots, L-1+(M-1)(N-1)$;
   (e) computing range-dependent filters according to $w(l)=\rho(l)(C(l)+R)^{-1}s$, where $\rho(l)=|x(l)|^2$ is the power of $x(l)$, and $R=E[v(l)v^H(l)]$ is the noise covariance matrix;
   (f) applying the range-dependent filters to y to obtain $[\hat{x}_2\{-(M-2)(N-1)\}, \ldots, \hat{x}_2\{-1\}, \hat{x}_2\{0\}, \ldots, \hat{x}_2\{L-1\}, \hat{x}_2\{L\}, \ldots, \hat{x}_2\{L-1+(M-2)(N-1)\}]$; and
   (g) repeating (d)–(f) for subsequent reiterative stages until a desired length-L range window is reached, thereby resolving the radar target from noise or other targets.

23. A method as in claim 22, wherein the RMMSE pulse compression is performed with a plurality of parallel processors.

24. A method as in claim 22, wherein the y samples of the radar return signal are obtained via A/D conversion.

25. A method as in claim 22, further comprising setting a nominal level for which the power estimates are not allowed to fall below.

26. A method as in claim 22, wherein the method is applied in an airport radar system.

27. A method as in claim 22, wherein the method is applied in a weather radar system.

28. A method as in claim 22, wherein the y samples of the radar return signal are obtained via A/D conversion.

29. A method as in claim 22, wherein a plurality of radar targets are resolved and separately identified.

* * * * *